United States Patent [19]

Shannon et al.

[11] Patent Number: 5,159,639
[45] Date of Patent: Oct. 27, 1992

[54] ASSISTIVE LISTENING DEVICE

[76] Inventors: Clark W. Shannon, 1544 W. Mineral Rd., Tempe, Ariz. 85283; Ellison F. Krueger, 2634 S. Gaucho, Mesa, Ariz. 85202

[21] Appl. No.: 656,758
[22] Filed: Feb. 19, 1991
[51] Int. Cl.⁵ ............................................. H04R 25/00
[52] U.S. Cl. ..................................... 381/68.5; 381/69; 381/69.2; 381/68
[58] Field of Search ...................... 381/68.5, 68, 68.1, 381/68.6, 68.7, 69, 69.2, 25, 183, 187, 169

[56] References Cited

U.S. PATENT DOCUMENTS

| | | | |
|---|---|---|---|
| 2,856,466 | 10/1958 | Gustafson et al. | 381/68.5 |
| 3,244,819 | 4/1966 | Sapara et al. | 381/68.5 |
| 3,588,384 | 6/1971 | Negley | 381/68.5 |
| 3,871,372 | 3/1975 | Bivins | 381/68.5 |
| 4,471,490 | 9/1984 | Bellafiore | 381/69.2 |
| 4,712,244 | 12/1987 | Zwicker et al. | 381/187 |
| 4,888,805 | 12/1989 | Karppala, Jr. | 381/68.5 |

FOREIGN PATENT DOCUMENTS

| | | | |
|---|---|---|---|
| 1272377 | 7/1968 | Fed. Rep. of Germany | 381/68.5 |
| 2642856 | 8/1990 | France | 381/68.5 |
| 0660531 | 4/1987 | Switzerland | 381/68.5 |

Primary Examiner—James L. Dwyer
Assistant Examiner—Jason Chan
Attorney, Agent, or Firm—Gregory J. Nelson

[57] ABSTRACT

An assistive listening device detachably securable to a temple frame of eyeglasses. A carrier engages the frame and has one or more clips to which the instrument housing attaches. The housing contains a speaker, microphone and amplifier circuitry. The power supply comprises a battery pack accessible through a door in the housing. The device is turned "on" and "off" by a closing or opening of the door. A sound conducting tube carries sound from the speaker to the ear of the wearer.

15 Claims, 3 Drawing Sheets

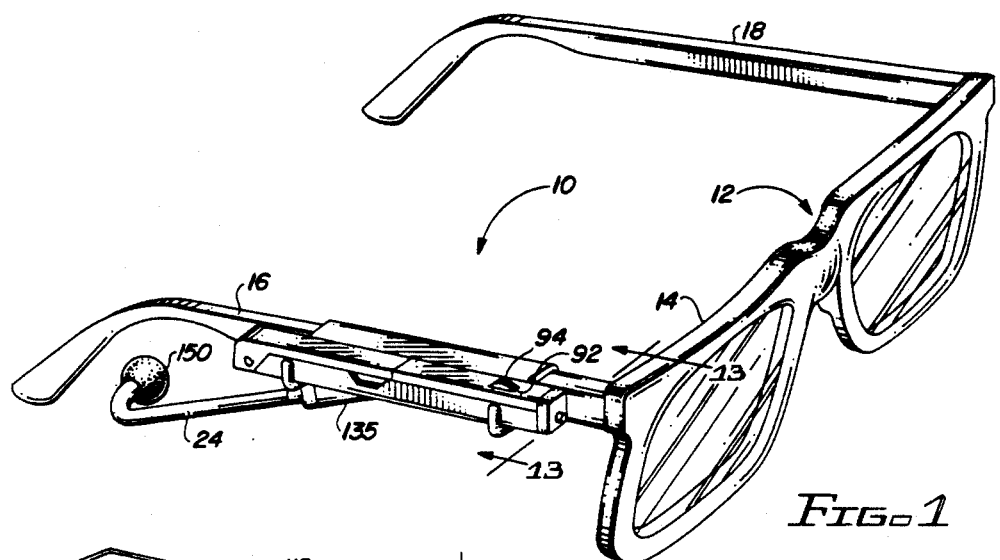
FIG-1
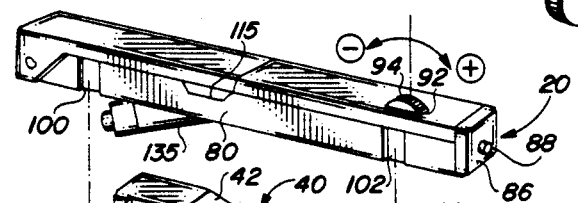
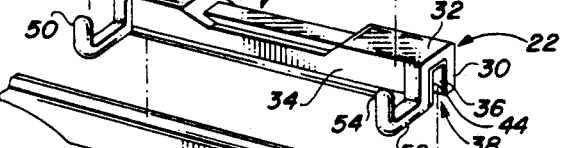
FIG-2
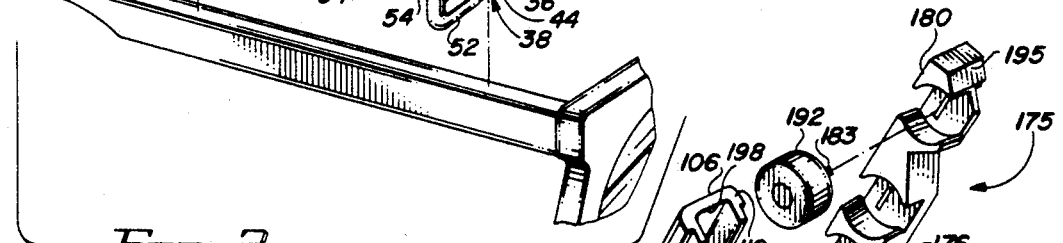
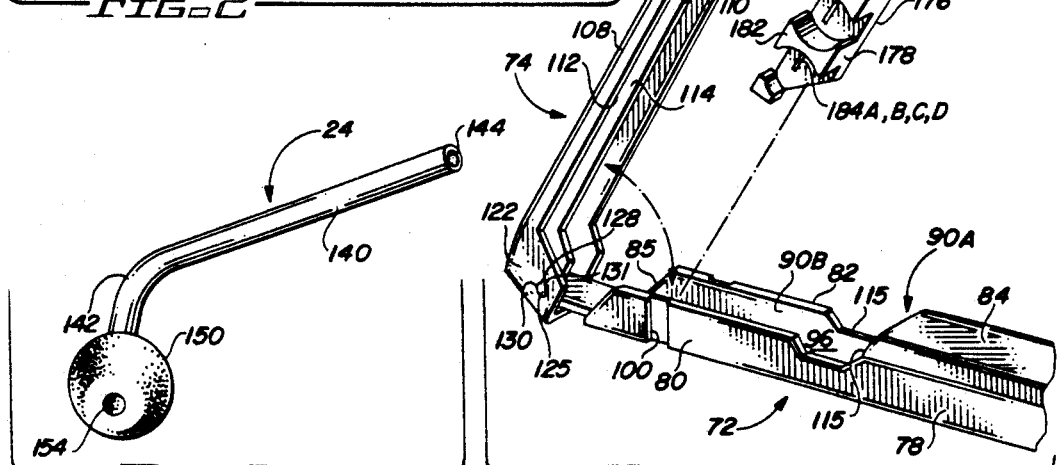
FIG-3
FIG-4

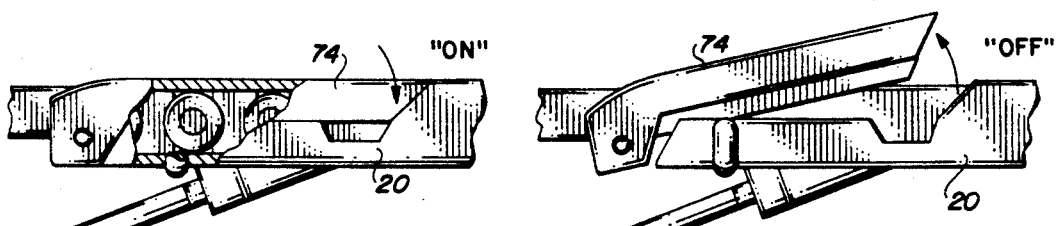
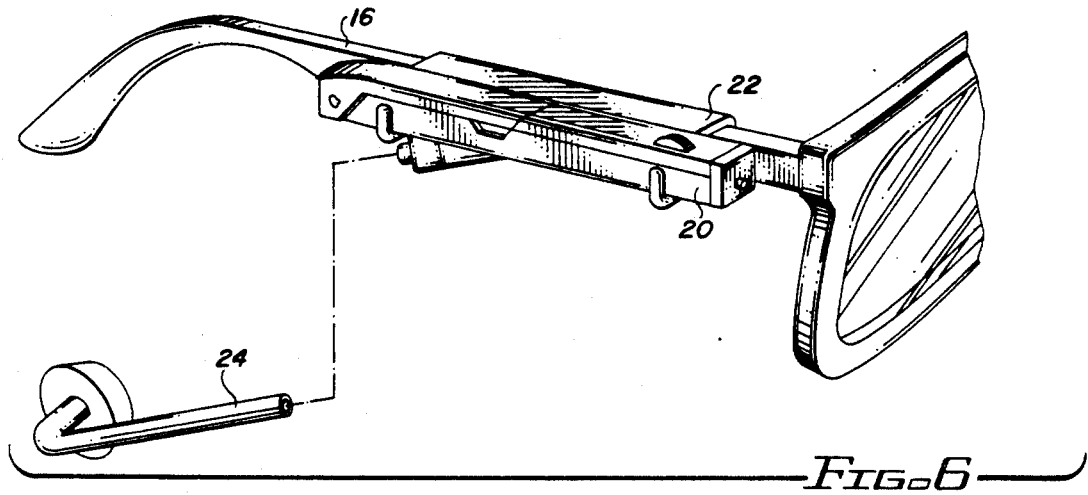
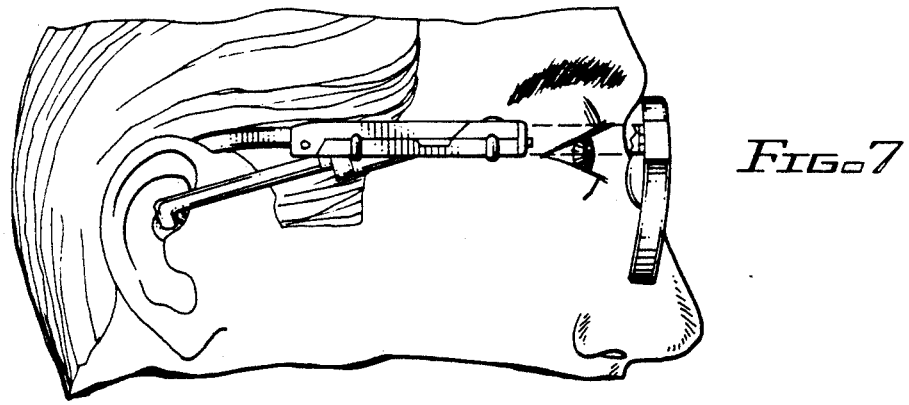
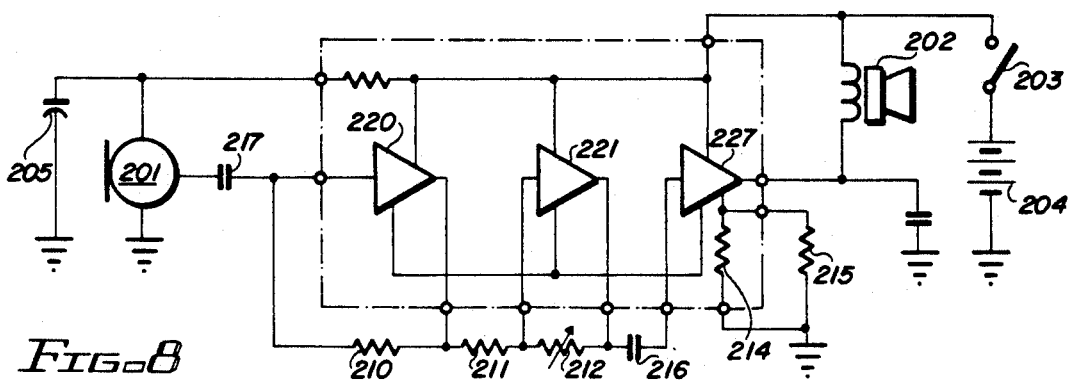

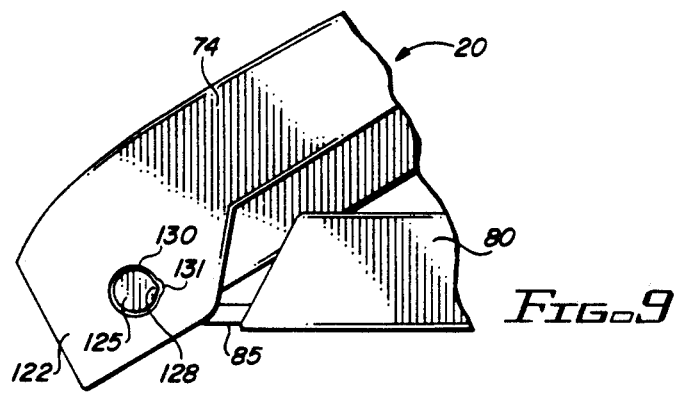
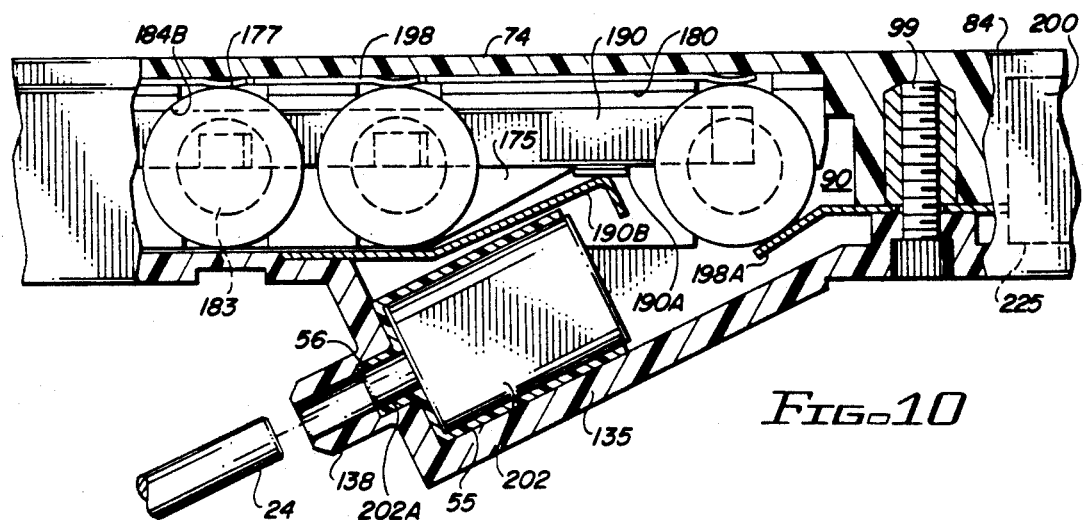
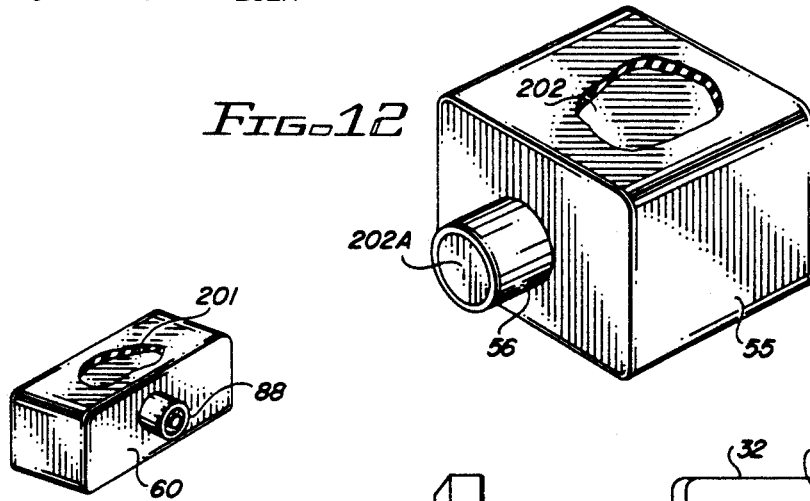
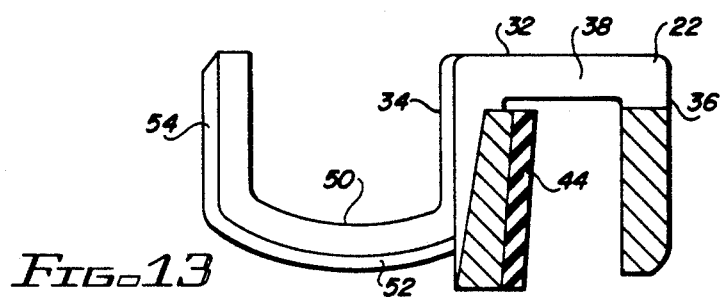

ASSISTIVE LISTENING DEVICE

FIELD OF INVENTION

This invention relates to assistive listening devices of a type particularly adaptable for utilization by persons wearing spectacles or eyeglass in which a part of the spectacle frame is used to support the device.

Hearing aids and assistive listening devices, collectively assistive hearing devices, are well known and over the years have improved in quality and effectiveness have through improvements in electronics been made smaller and more compact. The size of such devices is of particular concern to users. Individuals having hearing impairment generally do not wish to call attention to their condition and prefer assistive hearing devices which, in on to being effective, are not readily apparent to individuals.

Accordingly, various attempts can be found in the prior art to provide assistive hearing devices associated with or contained in the frames of eyeglasses or spectacles. This is done for convenience and to provide devices which have an inconspicuous appearance. However, approaches to the problem of concealment of hearing aids and assistive listening devices associated with eyeglass frames have not been totally satisfactory. The result, in many instances, has been an eyeglass frame having large temple frame members which are bulky and unattractive. Another disadvantage of combining assistive hearing devices and eyeglasses is that such a combination device does not permit the user to conveniently change eyeglasses. If, for example, the user wishes to utilize eyeglasses having both clear and tinted lenses, both pairs would have to be equipped with an assistive hearing device.

DESCRIPTION OF RELATED ART

The following patents disclose various assistive hearing devices for inclusion in or for attachment to eyeglass frames and are representative of the prior art in this area:

U.S. Pat. No. 2,207,705 shows eyeglasses having microphones mounted at the forward end of the tubular frame. The frames also house the battery and sound reproducing circuitry.

Inclusion of hearing aid components within the bow portion of eyeglasses is shown in U. S. Pat. No. 3,244,819.

U.S. Pat. No. 2,856,466 shows hearing aid components mounted to the opposite eyeglass temple frames. The components are mounted on chassis members with one chassis member containing the microphone and battery and the opposite chassis member containing the amplifier. The chassis members are secured to the bows by threaded fasteners.

U.S. Pat. No. 3,382,327 shows a coupling device for securing a hearing aid to eyeglasses. One of the eyeglass temple frame members is hollow and receives a rear temple section carrying the hearing aid having a detent which engages the front temple member.

U.S. Pat. No. 3,588,384 shows a microphone transducer and an earphone transducer which are secured to an eyeglass frame by a mounting member having a temple clip which is generally U-shaped and adapted to snap over the temple of the eyeglasses. The clip has an outer leg which is tapered for greater flexibility and comfort.

While the foregoing represent various attempts in the prior art to either integrate assistive hearing devices into an eyeglass frame or to attach the device to an eyeglass frame, these prior art designs have a number of deficiencies. Generally they are expensive, bulky, unattractive or are not practical in use.

SUMMARY OF THE INVENTION

Accordingly, it is an object of the present invention to provide an assistive listening device which may be readily and conveniently used with conventional eyeglasses without modification to the eyeglasses.

It is a further object of the invention to provide an assistive listening device which may be readily secured to either or both of the temple frame pieces of eyeglasses by the user with ease and convenience. Still another object of the present invention is to provide an assistive listening device for use with conventional eyeglasses. The assistive listening device is provided in a self-contained housing which may be easily removed from a carrier secured to the eyeglass frame.

Another object of the invention is to provide a new and useful assistive listening device which is mounted upon and supported by an eyeglass frame which may easily and conveniently be turned on and off and adjusted in volume by the user. The term "assistive listening device" refers to a device for amplifying sound for use by persons with mild or moderate hearing impairment.

The foregoing are some of the important objects of this invention. Other and further objects will become apparent in the following description, claims and drawings in which:

BRIEF DESCRIPTION OF THE DRAWINGS

FIG. 1 is a perspective view of a pair of eye-glasses showing the assistive listening device of the present invention attached to the right temple frame member;

FIG. 2 is an exploded view showing a portion of the temple frame member, attachment carrier and instrument portion of the assistive listening device;

FIG. 3 is a perspective view showing the sound conducting tube;

FIG. 4 is a perspective view showing a portion of the instrument housing in an open position and the battery pack removed from the instrument housing;

FIG. 5A is a partial side elevational view or the device in an "on" position;

FIG. 5B is a partial side elevational view of the device in an "off" position;

FIG. 6 is a perspective view showing the right temple frame member with the assistive listening device of the present invention attached thereto;

FIG. 7 is a side view showing the device positioned on the right temple frame member of a pair of eyeglasses worn by an individual;

FIG. 8 is a schematic diagram of the amplifier circuitry incorporated in the device;

FIG. 9 is an enlarged detail view of the rear of the instrument housing and door as indicated in FIG. 4;

FIG. 10 is a partial longitudinal view of the instrument housing partly broken away showing the device in an "on" position;

FIG. 11 is a perspective view of the microphone and boot;

FIG. 12 is a perspective view of the speaker and boot; and

FIG. 13 is a front view of the carrier.

DESCRIPTION OF THE PREFERRED EMBODIMENTS

Referring now to the drawings and particularly FIG. 1, the assistive listening device is generally designated by the numeral 10 and is shown in connection with a pair of representative eyeglasses designated as 12. The eyeglasses may be of any conventional type having a bridge and lens frame 14 with a pair of oppositely disposed temple frame members or bows 16 or 18 pivotally attached at opposite sides of the bridge. As is conventional, the distal end of the bows are generally curved downwardly and configured to fit behind the ears of the user.

The assistive listening device 10 is shown connected to the right temple frame member 16 it being understood that the device 10 may be secured to either or both of the frames 16 and 18.

As best seen in FIGS. 1, 2 and 3, the assistive listening device consists of three major components, including the instrument 20 which receives and amplifies sound, the attachment carrier 22 and the sound conducting tube 24.

The attachment carrier 22 supports the instrument and is attachable to the temple frame piece of most eyeglass frames and is reversible being useable with either bow or temple piece. The attachment carrier 22 consists of a generally elongate housing 30 having a top wall 32 and opposite side walls 34 and 36 which define a longitudinally extending channel 38 which is open on its bottom so the carrier may be mounted on a temple frame. An intermediate section of the carrier housing may be cut away at section 40 to expose a portion of the interior channel and permit the user visual access to the eyeglass frame during attachment of the cradle to the eyeglass frame. The cut-out also serves to reduce the weight of the carrier and allow convenient access to the door of the instrument as will be explained hereafter. The opposite ends of the cut-out section 40 preferably have downwardly sloping walls 42 as shown.

The carrier 22 is attached to the eyeglass frame by placing the downwardly opening channel 38 over the frame and pressing the carrier downwardly until the eyeglass frame is fully engaged in the channel which can be visually determined by observing the intermediate cut-out section 40. The carrier 22 is secured in place by the frictional engagement of the channel and the temple frame piece. To prevent damage to the frame piece and to accomodate physical variations in the frame piece, the channel 38 is at least partially lined with a resilient material 44. Lining 44 is best seen in FIG. 13 and may be rubber or any suitable elastomer which will frictionally engage the frame and deform slightly to accomodate various eyeglass frame configurations.

Carrier 22 supports retention means for the instrument shown as a pair of clip members 50 at opposite ends of the carrier extending from the interior wall 34 away from the frame. Each of the clip members 50 has a generally horizontally extending bight section 52 and an upwardly turned leg member 54 extending to an elevation approximately corresponding to the top 32 of the carrier. As will be explained hereafter, the clip members are adapted to detachably receive and retain instrument 20.

Instrument 20 has an elongate housing or body 72 having a door 74 which, as will be explained, is opened or closed to deactivate or activate the instrument. The body 72 has a bottom 78, front wall 86 and opposite side walls 80 and 82 which extend substantially the entire length of the housing. The rear edge of the side walls are inclined slightly at 85 to complimentarily receive the door 74 in the closed position. The bottom 78 extends rearwardly beyond the end of the side walls to provide a point of pivotal attachment for the door 74.

The main body is provided with a top wall 84 which extends to the approximate mid-point of the body. The front wall 86 defines an opening to permit the passage of sound to the port 88 of microphone 201 located in the forward section of interior chamber 90 of the instrument. The forward portion of chamber 90, as will be explained hereafter, receives the electronic components of the amplifier section and the rear portion of chamber 90 houses the battery pack. The body may be fabricated from several components secured by one or more fasteners 99.

Body 72 is configured with the top wall 84 having an aperture 92 which will receive a volume or gain control 94. The instrument side wall 80 is provided with vertically extending recesses or notches 100 and 102 at opposite ends. The instrument is dimensioned so that notches 100 and 102 are snugly engaged by U-shaped clips 50 on the attachment carrier. Thus, as best seen in FIG. 1, instrument 20 may be detachably secured to the carrier by engaging the clip members 50 and 52 in the notches 100 and 102 at the body side wall.

Door 74 has a top 106 and opposite side walls 108 and 110. The side walls 108, 110 are configured having a longitudinally extending lip or shoulder 112 on each side with flange 114 extending downwardly therefrom. The flanges 14 will seat within the interior of the body with the shoulders 112 abutting the upper edge of the rear portion of side walls 80 and 82 when the door is in a closed position as shown in FIG. 5A. Preferably, the upper edge of the side walls are recessed at 115 to expose a portion of the door side walls so they may be easily grasped by the user to pivot the door 74 upward to the off position as shown in FIG. 5B.

As best seen in FIGS 4 and 9, door 74 is pivotally or hingedly secured to the rear of the bottom wall 78 at side wall members 122 at oppositely extending pivot members 125 which are engaged in bores 130 provided in the opposite side walls of the cover. The pivot members 125 are each provided with radially extending projections 128 which will engage a selectively positioned detent 131 in the bore 130 at opposite side walls when the cover is in the open position shown in FIGS. 5B and 9. This construction provides a detent 131 so the user may tactily determine that the door is properly in the open position and the detent will temporarily secure the door 74 in the open position shown in FIG. 5B. Alternately, the detent may be omitted and door 74 held in a selected open position by frictional engagement between the door and body.

A projection 135 extends angularly rearward from the underside of the housing as best shown in FIG. 10. The distal end of the projection defines a connector 138 to which a sound conducting tube, as shown in detail in FIG. 3, may be connected.

The projection houses speaker 202 which is best seen in FIGS 10 and 12. The speaker is sheathed in a boot 55 which may be provided with projection 56 to receive the port 202A of the speaker. The port 202A extends or partially extends into the connection 138 as seen in FIG. 10. Boot 55 is fabricated from an elastomeric material with sound damping qualities which serves to isolate the speaker from the housing and other components to reduce feedback.

The sound conducting tube 24 consists of an axially extending tubular member 140 which is angularly disposed at 142 with respect to axial section 140. The tube may be made from a suitable plastic material and defines a hollow interior or lumen 144 through which sound is conducted. The distal end 142 terminates at a cushion 150 as shown in FIG. 3. Cushion 150 is a generally annular plug having a concentric opening 154 extending therein which receives the end of the sound tube. A slight taper allows the cushion to be comfortably inserted in the user's auditory canal as best seen in FIG. 7. Sound received and amplified within the instrument will be transmitted from the speaker through the sound conducting tube 24 to the user's ear with the ear cushion 150 serving to block out extraneous sounds.

The instrument 20 includes an amplifier section 200 which is received in the forward end of the instrument chamber 90 generally extending from the front wall 86 to the approximate mid-point at a location approximately coincident with the end of top wall 84. The amplifier section is provided on a conventional circuit board 225 with the amplifier being constructed generally as shown in FIG. 8. The circuit board 225 is vertically mounted in the body and carries the gain control 94. The amplifier circuit as shown in FIG. 8 includes a microphone transducer 201 for receiving the sound signal and an output transducer 202 for providing the audio signal to the wearer of the device. Each transducer is coupled through activating switch 74 to a power supply 204. Filter capacitors 205 and 206 are to provide the d.c. power signal applied to the transducers. The activating switch is formed as a part of the door 74 and the power supply 204 is contained in a unique battery pack, as will be explained hereafter.

A three-stage amplifier is coupled between the transducer 201 and the transducer 202 for establishing the gain therebetween. The gain for the first stage is set by the value of resistor 210 while the combination of resistors 211 and 212 provide gain control of the second stage. The combination of resistors 214 and 215 set the gain for the third stage in combination with the impedance of transducer 202. Capacitor 216 is provided at the input of the third stage amplifier 222 for d.c. isolation.

Capacitor 217 is coupled between the transducer 201 and the first stage amplifier 220 and establishes the peak frequency response of the circuit. The output of the first stage is coupled via resistor 211 to the input of second stage amplifier 221 and inversely controls the gain of the second stage. Variable resistor 212 provides direct control of the gain and serves as the user volume control for the circuit.

The amplifier includes a microphone transducer 201 for picking up sound which microphone is located in the housing interior immediately adjacent the forward end of the housing. The front port 88 of the microphone extends through the front wall 86 of the instrument body and allows sound to be picked up by the microphone. With the microphone located at the forward end of the housing, the microphone will normally be oriented towards the source of the sound as the wearer turns his or her head towards the sound. As seen in FIG. 11, the microphone transducer is encased or sheathed in an isolation boot 60 of rubber or other elastomeric material having sound damping qualities. The boot 60 is preferably molded closely conforming to the exterior configuration of the microphone transducer and has a tubular projection which accepts port 88 of the microphone transducer. The boot 60 serves to isolate the microphone from the housing and other components to prevent feedback.

The output or speaker transducer 202 is located near the middle of the instrument and is disposed within or adjacent the projection 135 to which the sound conducting tube attaches as has been explained above. Therefore, amplified sound is directed into the sound tube 24 to be transmitted to the wearer's ear at the distal end or the sound tube. The volume or gain control 94 projects through the upper cover of the instrument, may be easily adjusted by the wearer to adjust variable resistor 212 in the amplifier circuit. This operation can be easily accomplished as the volume control is readily accessible to the wearer.

The device is powered by a unique battery pack, best shown in FIGS 4 and 10. The battery pack 175 consists of a receptacle having side walls 176 and 182, bottom wall 178 and top wall 180. A plurality of longitudinally adjacent recesses 184A, B, C and D are defined by the receptacle, each adapted to snugly receive a battery 192. Batteries 192 are shown as the type of battery having a disk-like configuration as is conventionally used in hearing assistive devices. The batteries are snugly pressed in the recesses 184A 184B, 184C and 184D. The overall height of the side walls at the battery pack are selected so as to be slightly less than the diameter of the battery so that a peripheral portion of the battery extends beyond the top wall 180 of the battery pack. With batteries of this type, the circular housing is the positive terminal with the negative terminal of the battery being located as a concentric projection 183. Accordingly, conductive bus 190 is incorporated in the battery pack 175 extending longitudinally along the side wall 176 to contact the negative battery terminals 183. The bus 190 terminates at a forward end at contact location 190A which, in turn, contacts a mating contact 190B connected to the microphone and wired in the amplifier circuit.

A longitudinally extending positive bus 198 is provided on the interior of door 74 which, with the battery pack in position in the housing, interconnects the exterior surfaces of the batteries. Preferably the positive bus has arcuate contacts 177 corresponding to the battery locations to ensure better electrical contact. The forward-most battery 192 engages the angular surface of contact 198A which is connected to the amplifier circuit on the circuit board 225.

The battery pack holds a plurality of batteries 192 which substantially increases the usable life of the instrument. One advantage is that the battery pack 175 can be easily removed as a unit and the batteries replaced in a simple operation and the pack reinserted in the housing. The "on" and "off" operation of the unit is also simply accomplished. With the door 74 in the closed position as shown in FIG. 5A, the positive bus 198 extending longitudinally at the interior of door 74 will contact the periphery of the batteries. Normally, with the battery pack in position, the negative bus 190 engages contact 190B so the operation of the circuit is controlled by connecting or disconnecting the battery terminals from the amplifier by selective positioning or door 74.

If the user wishes to interrupt use of the assistive listening device, the user may simply grasp the forward end of the hinged door 74 at the small recesses 115 provided on either side of the housing and pivot the hinged door upward to the position shown in FIG. 5B. This will result in the interruption of the electrical connection at contacts 177 at the interior side of the door. Energization of the amplifier circuit is accomplished by simply closing door 74 to re-establish electrical connection.

The components of the instrument housing and attachment carrier can be fabricated of any suitable material which is light-weight, durable and has appropriate dielectric characteristics. Preferably, the components are molded from a plastic material such as that sold under the brand name Lexan or an equivalent material.

As indicated above, the attachment carrier will fit a wide variety of shapes and sizes of eyeglass frames. However, in some instances, it may be preferable to provide the user with several attachment carriers in different sizes or configurations from which the user may select. Similarly, the user may be provided with several sound conducting tubes which may be used in the auditory canal or adjacent the auditory canal at the preference of the user.

The device of the present invention is designed to be used as an assistive listening device for those with mild or moderate hearing impairment. The device may be easily and quickly attached to most eyeglass frames. The microphone pick-up or port is oriented forwardly so when the user's head is directed toward the sound source, the microphone will be properly oriented. The sheathing of the microphone and speaker serve to prevent undesirable feedback, insulate these components and damp out extraneous signals. The frontal position of the microphone and the rearward, opposite orientation of the speaker further serve to reduce feedback. The battery pack provides long life as it contains a plurality of batteries and battery replacement is easily accomplished. Further, the on/off controls and volume controls are easily accessible to the user. If the user wishes to entirely remove the assistive listening device, detachment is easily accomplished.

In summary, the present invention provides a novel, convenient and effective assistive listening device for attachment to eyeglass frames. It will be apparent to those skilled in the art to make various other modifications, alternative constructions and changes. To the extent these various modifications and changes do not depart from the spirit and scope of the appended claims, they are intended to be encompassed therein.

I claim:

1. An assistive listening device for use with eyeglasses having a frame including a temple bow member said assistive listening device comprising:
   (a) a carrier detachably securable to the eyeglass frame and having retention means thereon;
   (b) an instrument having a housing with a forward end, said housing being detachably securable at said retention means, said instrument having sound amplifier means, a microphone, speaker and power supply means;
   (c) sound conducting means attachable to said instrument housing at a location to receive the output of said speaker and to transmit sound to the region of the ear of the user; and
   (d) wherein said housing includes a door pivotally attached thereto and wherein said power supply means includes a battery receptacle removably positioned within said housing having first electrical contact means associated therewith engageable by second electrical contact means to energize said amplifier means when said door is in a first position and to de-energize said amplifier means when said door is in a second position.

2. The assistive listening device of claim 1 wherein said microphone is disposed at the forward end of the housing.

3. The assistive listening device of claim 1 wherein said sound conducting means comprises a tube detachably securable to said housing adjacent said speaker.

4. The assistive listening device of claim 1 wherein said carrier is detachably securable to said eyeglass bow member at an elongate channel frictionally engaging said bow member and wherein said retention means comprises clip means for detachably receiving said housing.

5. The assistive listening device of claim 1 wherein said door is provided with detent means to selectively maintain the door in a predetermined position.

6. The assistive listening device of claim 1 wherein said housing includes at least one recess which is adjacent said door in the said first position of said door.

7. The assistive listening device of claim 1 wherein said housing is constructed from a dielectric material.

8. The assistive listening device of claim 1 wherein said amplifier means includes gain control means having adjustment means manually adjustable by the wearer.

9. The assistive listening device of claim 4 wherein said channel includes an elastomeric lining.

10. The assistive listening device of claim 1 wherein said microphone and speaker are at least partially encased in a sound damping material to reduce feedback.

11. The assistive listening device of claim 1 wherein said battery receptacle contains a plurality of batteries.

12. The assistive listening device of claim 11 wherein said battery receptacle is removable from said housing.

13. An assistive listening device attachable to eyeglasses having a temple bow member, said assistive listening device comprising:
   (a) a carrier detachably securable to the temple bow, said carrier having a channel engageable with said bow, said carrier having retention means thereon;
   (b) an instrument having a housing with a door and including a compartment with a forward and rear ends, said housing being detachably securable to said carrier at said retention means, said instrument housing having sound amplification means, a microphone disposed at the forward end of the compartment with a microphone port forwardly oriented and a speaker located at an intermediate location of said housing having a speaker port;
   (c) sound conducting means attachable to said speaker port including a tube for conducting sound to the region of the ear of the wearer; and
   (d) a battery pack removably disposed in the rear end of said compartment having contact means which energize said amplification means when said door is in a predetermined position.

14. The assistive listening device of claim 13 wherein said speaker and microphone are encased in a sound-damping material.

15. An assistive listening device for use with eyeglasses having a frame including a temple bow member, said assistive listening device comprising:
   (a) a carrier detachably securable to the eyeglass frame and having retention means thereon;
   (b) an instrument having a housing with a forward end, said housing being detachably securable at said retention means, said instrument having sound amplifier means, a microphone, speaker and power supply means;

(c) sound conducting means attachable to said instrument housing at a location to receive the output of said speaker and to transmit sound to the region of the ear of the user; and (d) wherein said housing includes a door movably attached thereto and wherein said power supply means includes a battery receptacle positioned within said housing having first electrical contact means associated therewith engageable by second electrical contact means to energize said amplifier means when said door is in a first position and to de-energize said amplifier means when said door is in a second position.

* * * * *